United States Patent [19]

Kielbania et al.

[11] Patent Number: 4,675,495
[45] Date of Patent: Jun. 23, 1987

[54] BUTT WELDING MACHINE

[75] Inventors: Daniel M. Kielbania, Palmer; Stanley H. Gordon, Wilmington, both of Mass.

[73] Assignee: American Saw & Mfg. Company, East Longmeadow, Mass.

[21] Appl. No.: 723,453

[22] Filed: Apr. 15, 1985

[51] Int. Cl.$^4$ .............................................. B23K 11/04
[52] U.S. Cl. ...................................... 219/97; 219/101
[58] Field of Search .................. 219/97, 100, 101, 104

[56] References Cited

U.S. PATENT DOCUMENTS

| | | | |
|---|---|---|---|
| 1,522,195 | 1/1925 | Lemp | 219/97 |
| 2,647,980 | 8/1953 | Moore | 219/97 |
| 2,716,177 | 8/1955 | Cumming | 219/97 |
| 2,972,232 | 2/1961 | Possis et al. | 219/101 X |
| 3,424,060 | 1/1969 | Schueler | 219/97 |
| 3,681,563 | 8/1972 | Lifshits et al. | 219/97 |

FOREIGN PATENT DOCUMENTS 3129190  5/1983  Fed. Rep. of Germany ...... 219/104

*Primary Examiner*—Clifford C. Shaw
*Assistant Examiner*—C. M. Sigda
*Attorney, Agent, or Firm*—Chapin, Neal & Dempsey

[57] ABSTRACT

Flash-butt welder in which the piston rod of a pneumatic cylinder is connected to one end of a pivotable lever arm. A pneumatic system sequentially supplies air at two different pressures to the cylinder. Fixed and movable platens, each with a work piece clamping jaw, are fitted onto a unitary shaft which is mounted in laterally spaced and generally parallel relationship with the pneumatic cylinder. The movable platen is moved by the opposite end of the lever arm along the shaft toward the fixed platen. The movable platen includes a laterally extending arm portion for angular orientation of the platen on the shaft. A switch is disposed to be actuated by the lever arm as it advances to a predetermined position which energizes a solenoid valve to supply substantially higher pressure air to the cylinder. An hydraulic cylinder, disposed in spaced parallel relation to the shaft, includes a piston rod engaged with a pivotable linkage carried by the arm portion of the movable platen. The hydraulic cylinder controls the speed of movement of the movable platen toward the fixed platen during flash welding of the work piece. A pivotable latch mechanism is disposed for releasably retaining the linkage in a fixed angular position and to release the same so that the controlling effect of the hydraulic cylinder is released from the movable platen. An adjustable release pin is disposed to pivot the latch mechanism to release the linkage so that the hydraulic cylinder no longer controls the advance of the movable platen during the upset phase of the welding cycle.

9 Claims, 5 Drawing Figures

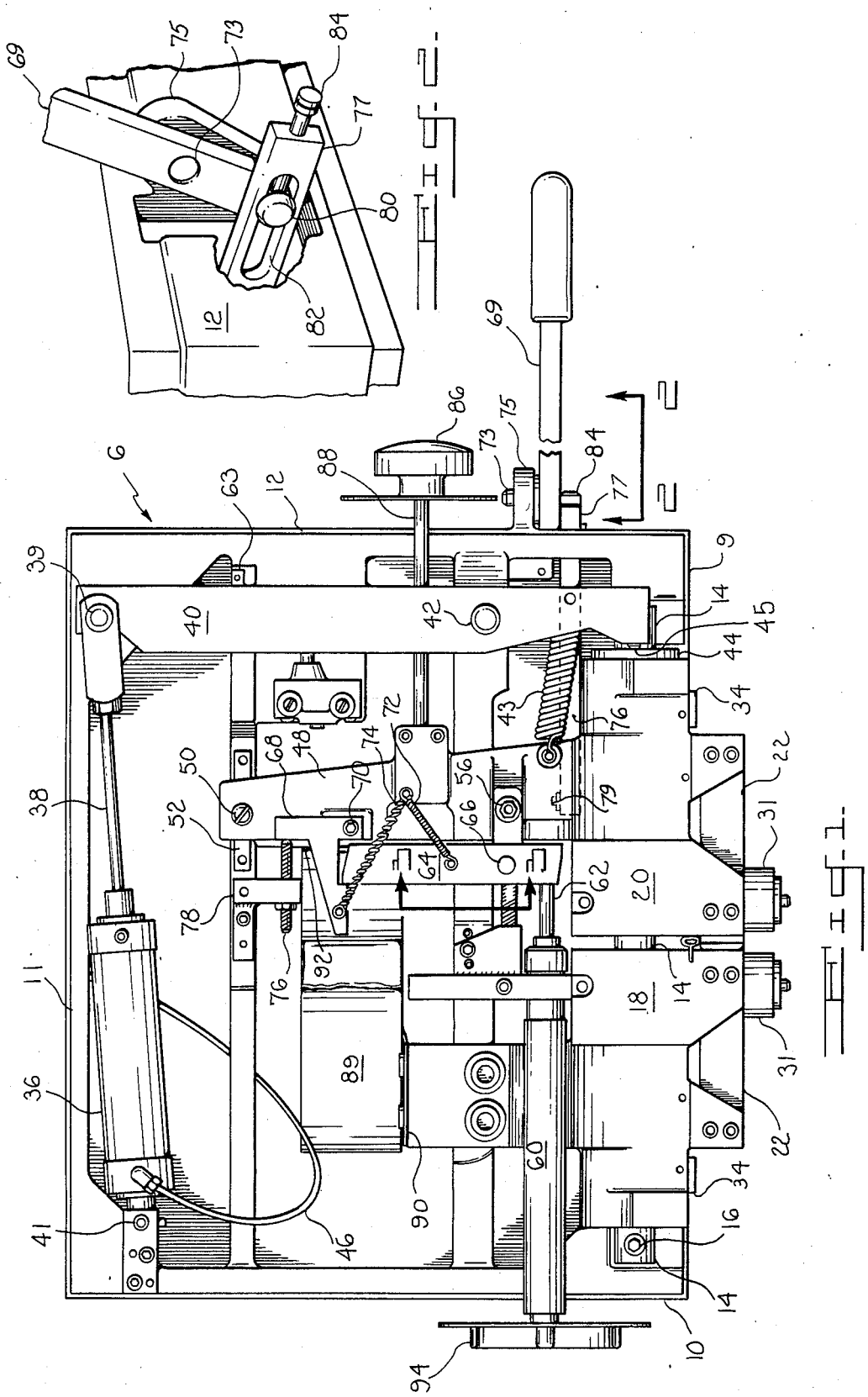

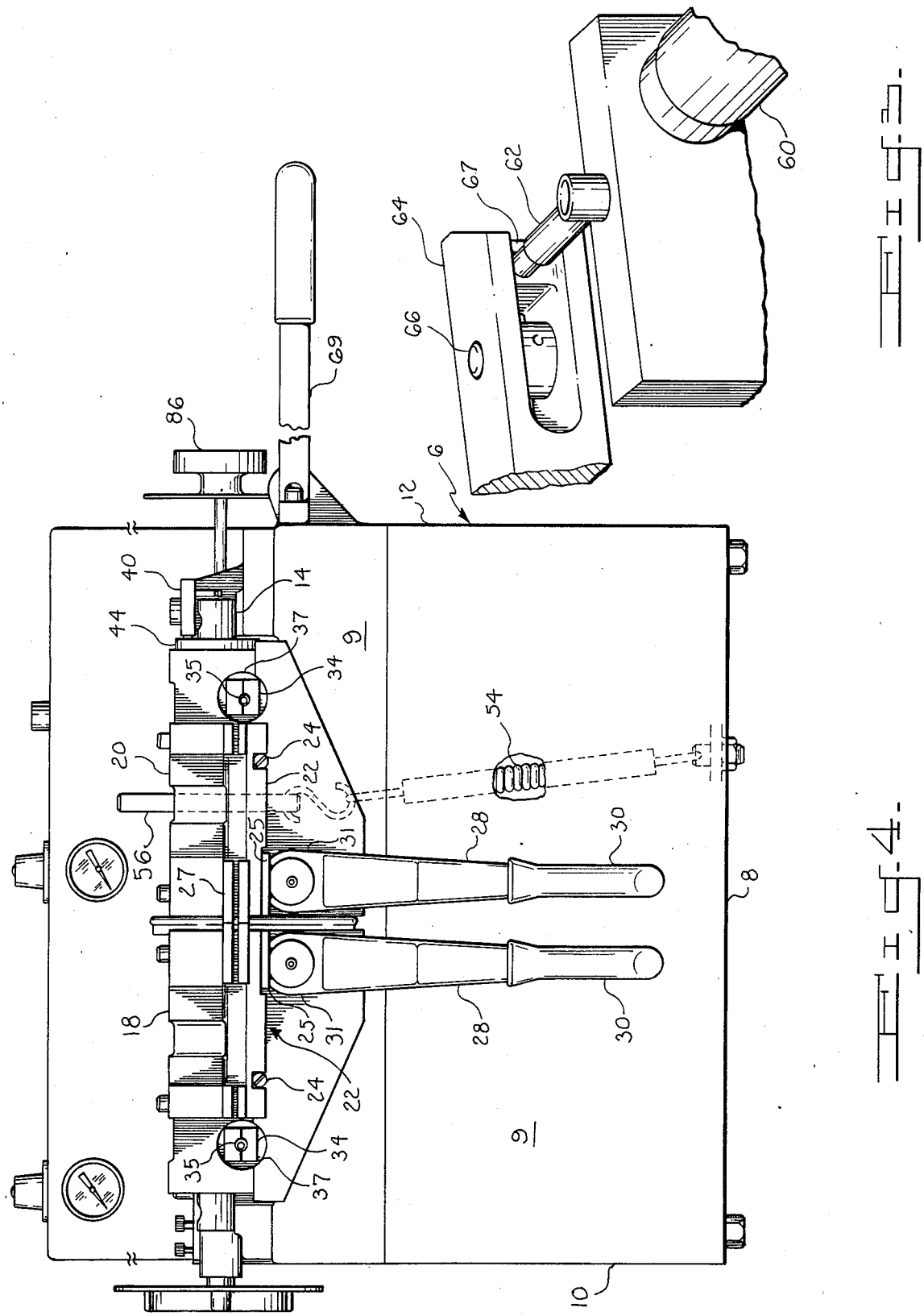

4,675,495

BUTT WELDING MACHINE

BACKGROUND OF THE INVENTION

This invention relates to an improved flash-butt welder of economical construction which ensures uniformly high quality welds on band saw stock. The most important factors in obtaining high quality welds are precise alignment of the edges being welded and accurate control of the relative rate of advance of the work pieces during the flashing and upset movement thereof.

There are a number of prior art patents which disclose flash-butt welders of this general type. These include U.S. Pat. Nos. 2,860,231; 3,370,149 and 4,235,115. The earliest of these prior patents to Stone shows a relatively complex combination of a pneumatic drive cylinder which rotates a bell crank opposed by a cam follower linkage 50 which rides on a cam plate 38. A separate trip cylinder pivots the linkage at a particular point in the welding cycle so that during the upset phase of the cycle the full force of the main cylinder will drive the movable platen.

The Allen U.S. Pat. No. 3,370,149 also discloses a main pneumatic cylinder which drives a lever 26. The pivotable movement of the lever is opposed by a quite complex bell crank and snubbing cylinder. The bell crank carries a cam follower which rides upon a cam surface formed on the outer end of the lever.

The Gordon U.S. Pat. No. 4,235,115 discloses the use of a power spring 40 to drive a pivotable lever 20 and thereby advance a movable platen 16 during the welding sequence. A snubbing cylinder 60 and cam 42 oppose the movement of the lever 20 which carries a drive wheel 50 carried on a toggle-type link 52.

It will be noted that each of the above patents involves, in various ways, a cam of diminishing radius which controls the rate of advance of the movable work-holding platen. Each of the cams has a drop-off surface at which there is a transition in acceleration as a cam follower rolls off the gradually diminished cam surface. The Stone patent is somewhat different in that a separate trip cylinder actually pivots the cam follower out of contact with the cam surface.

In the present flash-butt welder construction control of the welding cycle is independent of the particular configuration of a precut cam.

The principal object of this invention is to provide a flash-butt welder having improved construction and performance characteristics.

A further object of this invention is to provide a flash-butt welder of compact construction which is especially adapted for butt welding band saw blades.

Another object of this invention is to provide a flash-butt welder of economical construction designed to provide more effective transition from the flashing to the upset movement of the workpieces being welded.

The above and other objects of this invention will be more readily apparent from the following description read in conjunction with the accompanying drawing in which:

FIG. 1 is a top plan view of a flash-butt welder of the type embodying this invention;

FIG. 2 is a partial perspective view as seen from the direction of line 2—2 of FIG. 1;

FIG. 3 is a partial perspective view as seen from the direction of line 3—3 of FIG. 1;

FIG. 4 is a front elevational view showing the welder, and

Figure 5:
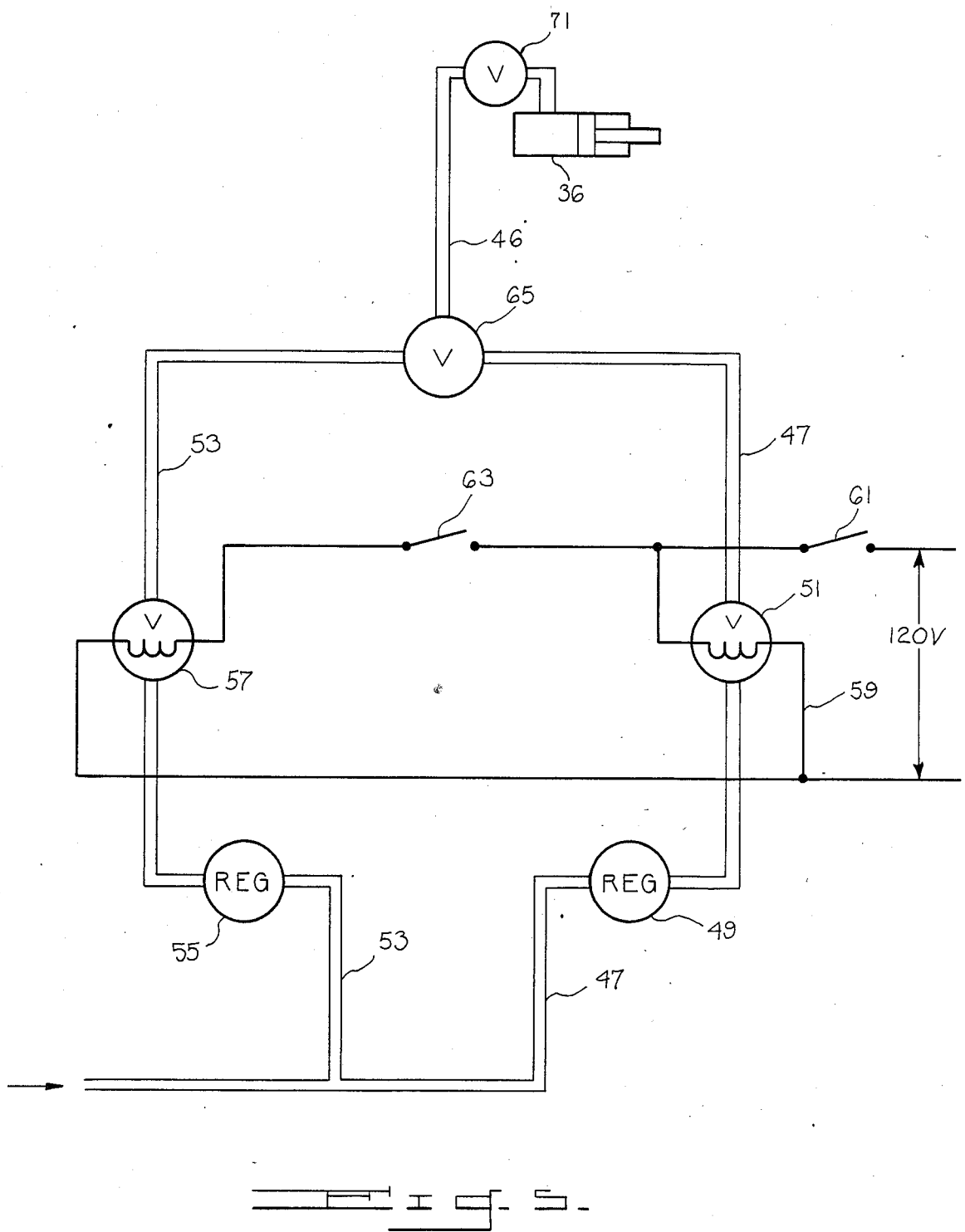
FIG. 5 is a schematic diagram showing a pneumatic and electrical system of the type used to control the operation of the welder.

Referring in detail to the drawings, a flash-butt welding machine is shown generally at 6. The machine is of generally rectangular shape and includes a base plate 8 (FIG. 4) and vertical front and back walls 9 and 11, respectively and side walls 10 and 12 which define an essentially box-like structure. Mounted across the upper front side of the machine is an integral shaft 14, bolted as at 16 adjacent its outer ends (FIG. 1). The shaft 14 is oriented generally parallel to the front wall of the machine. Fitted onto the shaft 14 is a fixed platen 18 and a platen 20 movable axially along the shaft 14 toward and away from the stationary platen 18. The platen 18 is electrically insulated from the shaft 14 and the platen 20 is grounded so that an electrical circuit will be provided through metal work pieces held by clamping blocks 22.

Each of the platens is provided with a work holding jaw or clamping block 22 pivotable vertically on a horizontal pivot pin 24. The uppr adjacent edges of each pivotable clamping block includes a hardened steel insert 25 which, together with fixed inserts 27, serve for securely clamping therebetween the outer ends of the work to be butt-welded. The machine embodying this invention is especially adapted for welding together the outer ends of band saw blade stock to form band saw loops for use in band saw machines. Clamping the ends of a length of band stock is achieved by rotating the two clamping levers 28 outwardly. The outer ends of the levers 28 are provided with hand grips 30 for this purpose and the inner semi-circular ends are pivotably mounted on fixed posts which extend from the platens 18 and 20 directly below the pivotable jaw blocks 22. By rotation of the left handle 30 clockwise and the right handle 30 counterclockwise, the adjacent ends of the pivotable blocks 22 are cammed upwardly by tangential edges 31 of the levers 28 into clamping relation with fixed jaw inserts 27.

A pair of blade alignment guides or stop plates 34 (FIG. 4) are mounted onto the outer surface of both the fixed platen 18 and the movable platen 20 by means of centrally located screws 35. In FIG. 4, only the outboard guide 34 of each pair of guides is shown, the other guide of each pair being located behind the blade clamping blocks 22. Each of the four guides consists of a generally rectangular plate with a vertically stepped outer surface of two different thicknesses. By loosening the center screws 35, the plates may be rotated 180 degrees to orient either the thin or thicker step portion at the top position depending on the tooth size of the saw blade stock to be welded. The four guides are located so that the four upper step surfaces thereof will be horizontally aligned to register with the plane of a saw blade when its outer ends are clamped by the clamping jaws so as to be engaged by the blades toothed-edge which must be disposed inwardly for clamping. For welding blade stock of coarse tooth size, the thinner step surfaces of the four alignment guides 34 would be disposed upwardly and for smaller tooth sizes, the thicker step surfaces would be rotated to the upper positions. The guides 34 serve an important function since the teeth of a saw blade have an angular offset and should not be clamped between the jaw blocks 25 and 27. A clearance between the outer surfaces of the alignment plates 34 and the inner edges of the clamping inserts 25 and 27 avoids this type of improper blade clamping. With this arrangement, when the blade ends are inserted between the clamping members with their toothed-edges contacting the guide plates 34, the blade ends will be automatically aligned in edge-to-edge relation.

In addition to this depth alignment feature, the outboard guides 34 of each pair is further adjustable horizontally inwardly and outwardly relative to the other two alignment guides. To provide for this further adjustment, each of the outer guide plates 34 is mounted on the outer surface of a bushing 37 which may be screwed into and out of threaded holes provided in the platens 18 and 20. By this adjustment, the proper "camber" can be imparted to the toothed-edge of the welded edge. Preferably, there should be a foreshortening of the toothed-edge of the band saw blade relative to the back edge thereof for proper cutting action when the band is tensioned about the pulleys of a band saw machine. The band saw ends must be aligned with an edge-to-edge tolerance from tooth-to-back not exceeding 0.002".

Variable driving forces for the flash and upset movements of the platen 20 are supplied by a pneumatic cylinder 36 which is pivotably mounted as at 41 adjacent the back wall of the machine. The cylinder has a piston rod 38 pivotably coupled at 39 to a bar-shaped lever 40. The lever is horizontally pivotable about a vertical pin 42 which extends upwardly from a fixed frame member disposed within the machine. A spring 43, connected at one end to platen 20 and at its other end to the lever 40, urges the lever 40 to its platen engaging position. The pivot pin 42 of lever 40, measured from the driving end, is about one-fourth the overall length of the lever. The lever thus provides about a three-to-one mechanical advantage from the cylinder 36 to the platen 20. With this mechanical arrangement, a relatively small pneumatic cylinder may be used to achieve the required application of force to the platen 20. At its outer end, the lever 40 includes a hardened pin 45 which engages a wear-resistant flange or collar 44 on the movable platen 20 at a point which is closely adjacent the upper surface of the shaft 14 and in a vertical plane containing the axis of the shaft 14. When air, under pressure, is supplied by conduit 46 to the outer end of the cylinder 36, the lever 40 will be rotated clockwise, as viewed in FIG. 1, and platen 20 will be moved toward fixed platen 18.

The compressed air to cylinder 36 is provided by an electrically controlled pneumatic system, as schematically illustrated in FIG. 5. Compressed air is supplied to the pneumatic system by conduit 47 to a first pressure regulator 49 which passes low pressure air to a solenoid valve 51. Another conduit 53 supplies air under pressure to a second pressure regulator 55 which passes high pressure air to solenoid 57.

An electrical circuit 59 serves to energize solenoid 51 when "ON/OFF" switch 61 is closed. A micro-switch 63 (FIGS. 2 and 5) is included in the electrical circuit to activate solenoid 57 when the movable platen 20 has advanced to a predetermined position relative to the fixed platen 18. Upon solenoid 51 being energized, low pressure air of 20–40 psi may be passed by conduit 47 to a shuttle valve 65. Thereafter upon activation of micro-switch 63, solenoid 57 will be energized and higher pressure air of 40–80 psi will be passed by conduit 53 to shuttle valve 65 whereby high pressure air will be supplied to the cylinder 36 via conduit 46. An exhaust valve 71 serves to exhaust air from the high pressure side of the pneumatic cylinder during the return stroke of the piston within the cylinder.

As shown in FIG. 1, micro-switch 63 is mounted on the frame of the machine in a position to be activated by the lever bar 40 when it has been swung to a predetermined angular position. The bar 40 thus moves at one angular rate under the low pressure air supplied to cylinder 36 and then at a substantially faster rate under the higher pressure air. High quality welds are achieved when a gauge pressure of double the flashing pressure is utilized for the upset phase of the welding cycle. For blades of ¼" and 0.025" thickness, a low pressure of 20 psi and a high pressure of 40 psi are prescribed while for a 1" blade of 0.035" thickness, air pressures prescribed are 40 psi and 80 psi, respectively.

The movable platen 20 includes a laterally extended arm or wing portion 48 which has an inwardly tapered after edge portion, as best illustrated in FIG. 1. In effect, this relatively long arm function in the manner of an outrigger to stabilize the angular orientation of the movable platen 20 which includes a tubular body portion disposed on the shaft 14. Adjacent the outer edge of the arm 48 is a threaded pin 50 which extends through a threaded bore in the arm and engages a hardened steel track 52. By rotating the pin 50, the vertical angular orientation of the platen 20 relative to the shaft 14 may be varied and accurately calibrated. Proper welding requires a surface-to-surface blade alignment tolerance not exceeding 0.0005". Intermediate the support pin 50 and its shaft-mounted, inner-end-portion, the arm portion 48 of platen 20 is urged toward a generally horizontal position by a coil spring 54 (FIG. 4). At its upper end, the spring is connected to the lower end of a vertical pin 56 which extends through the arm 48. At its lower end, the spring 54 is connected to the bottom panel of the machine and the spring is thus tensioned to urge platen 20 to a predetermined angular orientation on the shaft 14 while still enabling vertical angular adjustment of the platen 20 by rotation of pin 50. Although fixed at its lower end, the coil spring 54, because of its resilience, does not inhibit the reciprocable movement of the platen 20 along shaft 14 toward and away from the fixed platen 18 which is required for the welding cycle.

Movement by cylinder 36 of the platen 20 toward the fixed platen 18 is controlled or retarded by an hydraulic cylinder 60 which may be a "Kinecheck" type speed control unit containing hydraulic fluid and a return spring. The cylinder 60 is mounted on the machine in fixed position just inboard of the platen 18 and in generally parallel relation with the shaft 14. The piston rod 62 which extends from the inboard end of cylinder 60 is positioned to engage a linkage 64 pivotable on an upright pin 66 which extends upwardly from the upper surface of arm 48 of platen 20. The linkage 64 (FIGS. 1 and 3) consists of a beam member of generally rectangular cross-section which is pivotable in a horizontal plane and the outer end of the shaft engages a hardened, wear block 67 carried by the linkage adjacent one end while its opposite end is positioned to engage a shoulder or notch of a latch 68 (FIG. 1) pivotable about pin 70 extending upwardly from the arm 48 of platen 20. Coil springs 72 and 74 are provided to releasably urge the latch 68 and linkage 64 toward their latched relation, as shown in FIG. 1. The pivot pin 66 is located to provide a mechanical advantage such that about one-fourth the load applied by piston rod 62 will be seen by the tooth or notch of latch 68 which engages the opposite end of the linkage 64. This reduces the load on the latch 68 to that its tooth will wear many times longer than with other arrangements.

Means for actuating the latch 68 comprises an adjustable trip pin 76 is threaded through a bracket 78 so that its outer end is positioned to contact the outer arm portion of latch 68. This will occur when the platen 20 has advanced a predetermined distance toward the fixed platen 18. At this physical point in the flashing stroke, the pin 76 will cause latch 68 to be pivoted clockwise, as seen in FIG. 1, and linkage 64 will be released from the shoulder or tooth-edge of latch 68. At this instant, only shaft 62 is engaged with the linkage 64 and the latter will be completely free to pivot counter-clockwise whereby any retarding or controlling force exerted on the platen 20 by hydraulic cylinder 60 will be instantaneously released. It should also be noted that at this particular instant, higher air pressure will have already been supplied to the pneumatic cylinder 36. As a consequence, the full force of the pneumatic cylinder multiplied by the mechanical advantage of lever bar 40 will act to thrust the platen 20 directly toward platen 18 for the upset welding force.

The mounting of platens 18 and 20 on the unitary shaft 14 greatly facilitates their mutual alignment. In addition, the geometic relationship of the shaft 14 and the axes of the two cylinders 36 and 60 provides a compact and mechanically efficient construction. These components are generally coplanar, being disposed at about the same level in the machine. In addition, the axes of the shaft and cylinders are laterally spaced, coterminous and generally parallel. The cylinder 36 exerts a driving force in one direction and moves platen 20 in the opposite direction. Hydraulic check cylinder 60 applies a restraining force on platen 20 which is directly opposed to its path of movement on shaft 14.

A cocking lever 69 is vertically pivotable on pin 73 (FIG. 2), supported by a bracket 75 which extends outwardly from the right side wall of the machine. The lever 69 is adjustably coupled to a horizontally movable connecting bar or rod 77, the inner end of which is connected by a fastener 79 to the movable platen 20. The lower end of the lever 69 is drivingly coupled to the rod 77 by means of headed pin 80 slidably disposed in an elongated slot 82 provided adjacent the outer end of bar 77. The slot 82 is of sufficient length so that during the flashing stroke of the platen 20 the bar 77 may be carried relative to the pin 80. An adjusting pin 84 slidably fits through a clearance hole in the outer end of the bar 77 and its inner end is threaded into a correspondingly threaded hole provided diametrically in the pin 80. By screwing the pin 84 into or out of the cross-pin 80, the initial or cocking position of the movable platen 20 may be adjusted and accurately calibrated. By downward pivotable movement of the lever 69 to a horizontal position, the movable platen 20 will be moved to its cocking position relative to the fixed platen 18. In effect, this cocks the machine for the proper automatic welding cycle and preloads cylinder 60. After cocking the machine, the opposite ends of the saw blade band to be welded may be loaded in the clamping jaws of the machine for the welding operation.

Adjacent the cocking handle 69 is a knob 86 having a dial associated therewith by which the cutout time of the welding current supplied by transformer 89 may be adjusted. Current cutoff for flash-butt welding should be accurately controlled by rotating shaft 88 using knob 86. Extending radially from the shaft 86 is a collar or trip mechanism (not shown) which is adapted to engage a small cutoff switch (not shown). Current cutoff can be adjusted to occur before, at or after upset by a precise repeatable amount. A dial 94 is provided for varying the flashing time and when set to different values, is connected to "open" or "close" a port in the cylinder to thereby vary the retarding force exerted by cylinder 60 on the movable platen 20.

OPERATION

After cocking the machine using lever 69, one end of a saw blade to be welded by the machine is first inserted in the clamping mechanism mounted on the fixed platen 18 with the blade teeth in contact with the pair of longitudinally spaced alignment guides 34 on the stationary platen 18. A tooth size chart is provided to assist in the proper choice of the alignment guide setting. Generally, for larger tooth size, the thin surface is disposed upwardly and vice versa for blades having smaller tooth size.

The left-hand clamping handle 28 is then rotated clockwise until the saw blade is firmly clamped between the fixed and movable clamping blocks. The opposite end of the band saw blade is similarly clamped between the jaw blocks carried by the movable platen 20 with its tooth-edge also disposed against the other pair of blade guides 34 carried by platen 20. The end edges of the blade are spaced apart with a gap not greater than 1/32". A feeler gauge may be used to measure this gap and the adjusting screw 84 is used to adjust the "cocked" position of the movable platen.

After the blade stock is properly clamped, the machine is started by activating start switch 61 (FIG. 5) whereupon compressed air, at a first pressure, is supplied to the pneumatic cylinder 36 by the compressed air supply system illustrated in FIG. 5. The weld current transformer 89 is also energized at this time.

Piston rod 38 pivots the horizontal lever bar 40 clockwise about its pivot pin 42 and the opposite end of the bar drives the platen 20 on shaft 14 toward the fixed platen 18. The speed of the platen 20 is controlled or retarded by the hydraulic cylinder 60. the outer end of the piston rod 62 is engaged with the linkage 64 which is carried on the upper surface of the arm portion 48 of platen 20. The piston engages linkage 64 adjacent the end disposed closer to the front wall of the machine. The linkage 64 is prevented from being rotated by latch 68 engaged with the opposite end of the linkage 64.

As the movable platen is advancing toward the fixed platen, electrical energy for the welding process is supplied by a transformer 89 via the platens to the blade ends being welded by electrical conductors connected to the two platens, as illustrated at 90 and 92 whereby an electrical current path is provided through the ends of the saw blade clamped by the blocks 22.

At a predetermined time in the welding cycle, when the lever bar 40 reaches a given horizontal angular position, microswitch 63 is activated and high pressure air is supplied to the cylinder 36 by actuation of solenoid 57 (FIG. 5). This causes a rapid acceleration of the movable platen 20 and shortly thereafter, about one second later, latch 68 contacts stop pin 76 and is tripped or pivoted thereby to release linkage 64. When this occurs, the retarding effect of the hydraulic cylinder 60 on the movable platen 20, by its engagement with linkage 64, is removed and a high speed unretarded upset force is applied to forcefully drive the blade ends together to complete the weld. The welding current is automatically cut off after elapse of a predetermined electrical duration determined by the setting of the current cut off dial using knob 86. The machine is then turned "off" and platen 20 is retracted by upward movement of lever 69 to ready the machine for the next cycle.

Having thus described this invention, what is claimed is:

1. Flash-butt welding machine having a welding cycle with flash and upset phases for welding together the terminal ends of saw blade stock having a toothed edge portion with a predetermined tooth size, said machine comprising a pneumatic cylinder with a piston rod extending from one end thereof, a lever pivotable in response to movement of said piston rod and having one end which drivingly engages a movable platen, a stationary platen and the movable platen mounted on a unitary shaft, one of said platens being electrically insulated from said shaft, jaws on each of said platens for firmly clamping the terminal ends of said saw blade stock to be butt-welded by said machine, means for supplying compressed air at a first air pressure into said pneumatic cylinder to advance the movable platen during flash-welding of said blade stock and at a second higher air pressure to accelerate the movable platen in response to a predetermined position of the movable platen relative to the stationary platen, switch means for sensing said predetermined position and for activating said air supply means to supply the higher air pressure to said pneumatic cylinder to accelerate the movable platen to the upset phase of the welding cycle, a pivotable linkage carried by said movable platen, a trip latch engaged with said linkage to releasably retain the same in fixed angular orientation on the movable platen, a single acting hydraulic cylinder with a piston rod extending therefrom in a direction generally opposite the direction of movement of the movable platen for releasably engaging said linkage for retarding the advance of said movable platen toward the stationary platen, and means disposed to trip said latch to release said linkage from its fixed angular orientation so that the piston rod of said hydraulic cylinder is completely disconnected from the movable platen whereby the speed of movement of the movable platen, no longer retarded by the hydraulic cylinder, is rapidly accelerated for the upset phase of the welding cycle.

2. Flash-butt welding machine as set forth in claim 1, in which said lever is mounted horizontally on a pivot pin substantially closer to the end of the lever which drivingly engages the movable platen than to its other end so as to provide a substantial mechanical advantage of the force applied to the other end of the lever by the piston rod of the pneumatic cylinder, said lever being engaged with the movable platen at a point closely adjacent to the shaft on which it is mounted.

3. Flash-butt welding machine as set forth in claim 1, in which the pneumatic cylinder, the hydraulic cylinder and the unitary shaft on which the platens are disposed in generally parallel, and laterally spaced relation.

4. Flash-butt welding machine as set forth in claim 1, in which said movable platen includes a tubular body portion and a horizontally extending arm portion having adjustable support means adjacent its outer end for adjusting the vertical angular orientation of the movable platen on said shaft, and means releasably urging said arm portion to its horizontal orientation.

5. Flash-butt welding machine as set forth in claim 1, in which the stationary and movable platen each includes an outer surface, said clamping jaws each being spaced outwardly of said outer surface to provide clearance for the toothed-edge portion of the saw blade stock, a pair of spaced alignment guides disposed on each of said platens and disposed to be engaged by the portion of said saw blade stock when clamped by said jaws.

6. Flash-butt welding machine as set forth in claim 1, in which said movable platen includes a outwardly extending arm portion, said linkage being pivotable about a pin extending from the arm portion of the movable platen, the pivot pin of the linkage being located substantially closer to one end of the linkage, said latch being disposed to engage the other end of the linkage and the piston rod of the hydraulic cylinder being disposed to engage the linkage adjacent said one end whereby a substantial mechanical advantage is provided for disengaging the latch from said linkage.

7. Flash-butt welding machine as set forth in claim 1, in which a cocking lever is pivotably mounted to move said movable platen to a predetermined first position relative the stationary platen, said cocking lever including means for adjusting said predetermined first position.

8. Flash-butt welding machine as set forth in claim 5, in which each said alignment guides is rotatably mounted and has a stepped outer surface configuration for common selected angular orientation depending upon the tooth size of the saw blade stock to be welded.

9. Flash-butt welding machine as set forth in claim 8, in which at least one of each pair of alignment guides is mounted for in and out adjustment relative the clamping jaws to weld the saw blade stock with predetermined camber.

* * * * *